US011094488B2

(12) United States Patent
Ando

(10) Patent No.: US 11,094,488 B2
(45) Date of Patent: Aug. 17, 2021

(54) PORT CONNECTION CIRCUIT, PORT CONNECTION CONTROL METHOD AND ELECTRONIC DEVICE

(71) Applicant: TOSHIBA CLIENT SOLUTIONS CO., LTD., Tokyo (JP)

(72) Inventor: Motoaki Ando, Tokyo (JP)

(73) Assignee: TOSHIBA CLIENT SOLUTIONS CO., LTD., Tokyo (JP)

( * ) Notice: Subject to any disclaimer, the term of this patent is extended or adjusted under 35 U.S.C. 154(b) by 53 days.

(21) Appl. No.: 16/537,445

(22) Filed: Aug. 9, 2019

(65) Prior Publication Data
US 2019/0362921 A1 Nov. 28, 2019

Related U.S. Application Data

(63) Continuation of application No. 15/359,523, filed on Nov. 22, 2016, now Pat. No. 10,418,213.

(30) Foreign Application Priority Data

Nov. 26, 2015 (JP) .................................. 2015-230341

(51) Int. Cl.
*H01H 47/00* (2006.01)
*G06F 13/42* (2006.01)
(Continued)

(52) U.S. Cl.
CPC ......... *H01H 47/00* (2013.01); *G06F 13/4282* (2013.01); *H01R 24/60* (2013.01); *H02J 13/00* (2013.01); *H01R 2107/00* (2013.01)

(58) Field of Classification Search
CPC ...... H01H 47/00; G06F 13/4282; H02J 13/00; H01R 24/60; H01R 2107/00
See application file for complete search history.

(56) References Cited

U.S. PATENT DOCUMENTS 6,253,329 B1    6/2001  Kang
6,611,921 B2 *  8/2003  Casebolt ............... G06F 1/3203
                                                713/324

(Continued)

FOREIGN PATENT DOCUMENTS

JP    2003-271270 A    9/2003
JP    2009-289124 A    12/2009
JP    2013-142992 A    7/2013

OTHER PUBLICATIONS

"Electronics Tutorial about the RC Time Constant" Anon. dated Mar. 25, 2010.

(Continued)

Primary Examiner — Pinping Sun
(74) Attorney, Agent, or Firm — Rutan & Tucker, LLP

(57) ABSTRACT

According to one embodiment, a port connection circuit includes a controller includes a first port configured to selectively switch to an input state or to an output state, a second port configured to output a switch control signal, a third port configured to detect an event, an input contact connected to or disconnected from an output contact of an external connector and connected to the third port, a switch connected between the input contact and the first port, and a switch control circuit configured to close or open the switch based on a voltage of the input contact.

12 Claims, 5 Drawing Sheets

(51) Int. Cl.
*H02J 13/00* (2006.01)
*H01R 24/60* (2011.01)
*H01R 107/00* (2006.01)

(56) References Cited

U.S. PATENT DOCUMENTS

| | | | |
|---|---|---|---|
| 6,947,272 B2 | 9/2005 | Daniels et al. | |
| 7,863,906 B2 | 1/2011 | Terlizzi et al. | |
| 8,358,100 B2 | 1/2013 | Helfrich | |
| 8,890,599 B1 | 11/2014 | Xiao et al. | |
| 8,928,189 B2* | 1/2015 | Toivola | G06F 13/4081 |
| | | | 307/130 |
| 9,385,530 B2* | 7/2016 | Lee | H02J 1/10 |
| 9,395,778 B2 | 7/2016 | Fritchman et al. | |
| 9,470,644 B2* | 10/2016 | Remple | G01R 19/0084 |
| 9,899,995 B2 | 2/2018 | Niino et al. | |
| 2007/0025038 A1* | 2/2007 | Biagi | G11C 8/20 |
| | | | 361/90 |
| 2007/0114849 A1 | 5/2007 | Falik et al. | |
| 2008/0265838 A1 | 10/2008 | Garg et al. | |
| 2009/0276546 A1 | 11/2009 | Lui et al. | |
| 2011/0127840 A1* | 6/2011 | Chang | H02J 1/10 |
| | | | 307/80 |
| 2011/0175461 A1 | 7/2011 | Tinaphong | |
| 2011/0208503 A1* | 8/2011 | Stritt | G06F 13/4081 |
| | | | 703/21 |
| 2011/0273235 A1 | 11/2011 | Chen et al. | |
| 2012/0030485 A1* | 2/2012 | Kawano | G06F 1/266 |
| | | | 713/300 |
| 2012/0306516 A1 | 12/2012 | Ueno | |
| 2013/0103966 A1 | 4/2013 | Liu | |
| 2013/0138838 A1 | 5/2013 | Kim | |
| 2013/0179603 A1 | 7/2013 | Tu et al. | |
| 2013/0244491 A1 | 9/2013 | Sarwar et al. | |
| 2013/0322010 A1* | 12/2013 | Hung | G06F 1/1632 |
| | | | 361/679.41 |
| 2015/0008749 A1 | 1/2015 | Rhee | |
| 2015/0207420 A1 | 7/2015 | Wang et al. | |
| 2015/0220139 A1* | 8/2015 | Puthillathe | G06F 13/385 |
| | | | 713/323 |
| 2015/0222761 A1 | 8/2015 | Zhao et al. | |
| 2016/0156137 A1 | 6/2016 | Pan et al. | |
| 2017/0154743 A1 | 6/2017 | Ando | |
| 2018/0143931 A1* | 5/2018 | Miyaoka | G06F 13/4081 |

OTHER PUBLICATIONS

U.S. Appl. No. 15/359,523, filed Nov. 22, 2016 Non-Final Office Action dated Oct. 17, 2018.
U.S. Appl. No. 15/359,523, filed Nov. 22, 2016 Notice of Allowance dated May 3, 2019.

\* cited by examiner

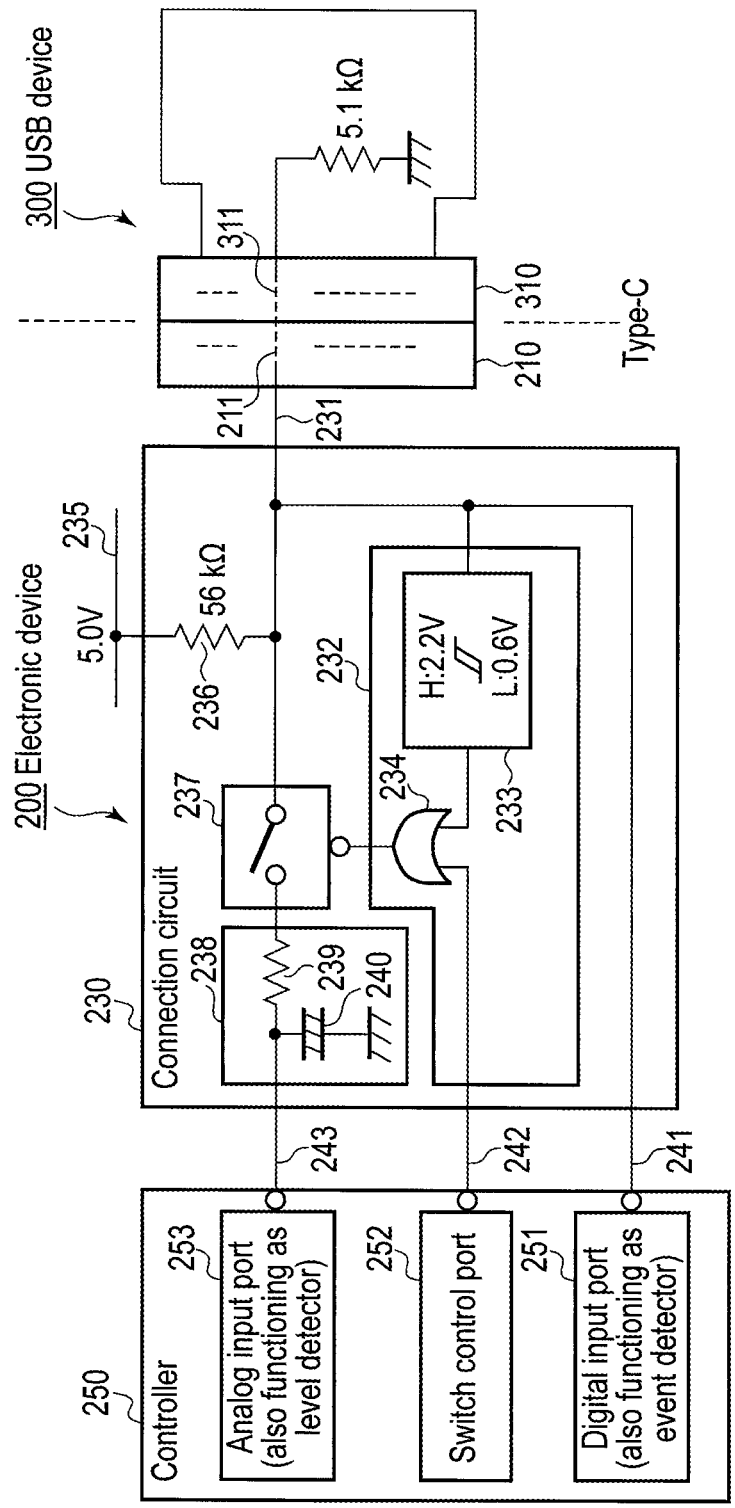
F I G. 3

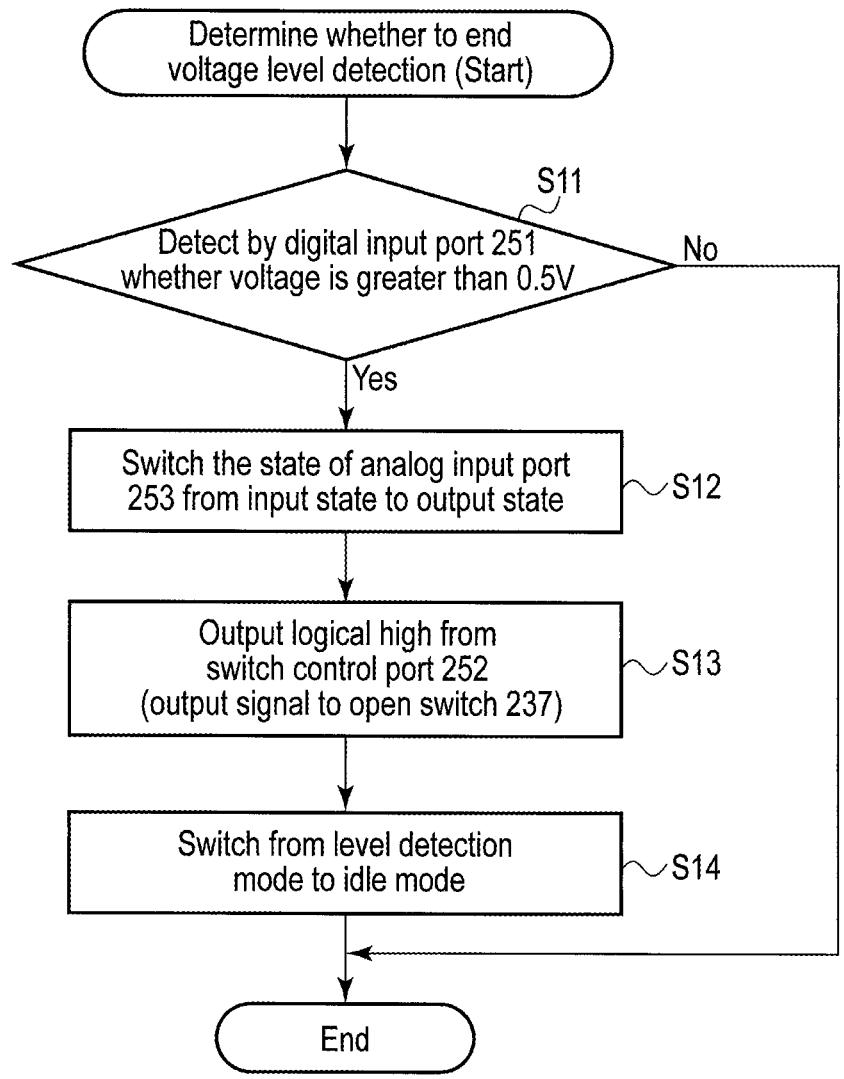
F I G. 6

PORT CONNECTION CIRCUIT, PORT CONNECTION CONTROL METHOD AND ELECTRONIC DEVICE

CROSS-REFERENCE TO RELATED APPLICATIONS

This application is a continuation of U.S. patent application Ser. No. 15/359,523, filed Nov. 22, 2016, which is an application based upon and claims the benefit of priority from Japanese Patent Application No. 2015-230341, filed Nov. 26, 2015, the entire contents of which are incorporated herein by reference.

FIELD

Embodiments described herein relate generally to a port connection circuit, a port connection control method and an electronic device.

BACKGROUND

Input/output interfaces include serial interfaces such as RS-232C and Universal Serial Bus (USB). In the case of connecting a peripheral device to a host device by using the USB interface (often referred to simply as USB), a port control device performs port control by detecting a connection state of these devices.

Recently, the USB 3.1 standard has been developed, and a new USB interface called Type-C has been standardized. In inserting a plug into a socket, according to the USB Type-C interface, unlike the conventional interfaces up to USB 3.0, the plug can be inserted either way up. The Type-C connector is the so-called reversible-type connector and has characteristics of exchanging a USB signal at a maximum transmission speed of 10 Gbits/s, transmitting a video signal conforming to the standard such as DisplayPort, High-definition Multimedia Interface (HDMI) or Mobile High-definition Link (MHL), and having a power delivery function of supplying a maximum power of 100 W. The USB Type-C cable has identical plugs at both ends, and unlike most conventional USB cables, the type of the connector is not physically differentiated between Type-A and Type-B on the host device side, but the USB interface still maintains the logical relationship between a host device and a peripheral device. Therefore, the relationship between a host device and a peripheral device is determined based on connection detection and signal direction detection at the time of connection via a configuration channel provided in the Type-C cable. Note that, although connectors are referred to as a socket and a plug, the socket and the plug may also be referred to as respective connectors or as a first connector and a second connector.

Other than those described above, for example, in the power delivery function, the Type-C connector determines a voltage and a current to be actually supplied in an operation based on a power deliver protocol message exchanged via the configuration channel.

In this way, the configuration channel is used to detect a device connection and then perform a negotiation process with a device of various functions based on a communication protocol via one contact of the USB Type-C.

As described above, the configuration channel performing communication via one contact of the USB Type-C is used to detect a device connection and then perform a negotiation process with a device of various functions based on a communication protocol. There are two methods to realize these connection detection function and communication function, that is, a method of connecting an IC dedicated to the USB Type-C to the connection contact and a method of connecting a microcomputer to the connecting contact. However, the use of a dedicated IC causes an increase in cost, while the use of a microcomputer requires two connection contacts and their switch control because it is difficult to realize these two functions through the same connection contact.

The present embodiment aims to provide a port connection circuit, a port connection control method and an electronic device which can easily switch the connection detection function and the communication protocol detection function.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 shows an exemplary structure of an embodiment.

FIG. 6 is a flowchart showing exemplary processing executed by a controller when a USB device is removed from a system adopting an embodiment.

DETAILED DESCRIPTION

Various embodiments will be described hereinafter with reference to the accompanying drawings.

In general, according to one embodiment, there are provided a port connection circuit, port connection control method and electronic device. The present embodiment aims to provide a port connection circuit, port connection control method and electronic device which can switch selectively between the connection detection function and the protocol function.

According to an embodiment of present disclosure, a port connection circuit comprising:

a controller comprising a first port configured to selectively switch to an input state or to an output state, a second port configured to output a switch control signal, a third port configured to detect an event;

an input contact connected to or disconnected from an output contact of an external connector and connected to the third port;

a switch connected between the input contact and the first port; and a switch control circuit configured to close or open the switch based on a voltage of the input contact.

Embodiments will be described hereinafter with reference to the accompanying drawings.

Figure 1:
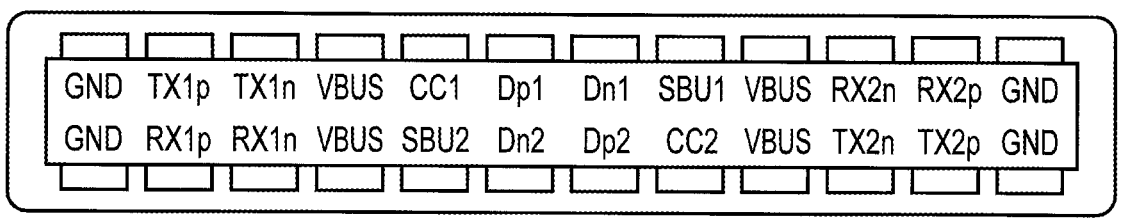
FIG. 1 shows a USB Type-C socket interface of an embodiment.
Figure 2:
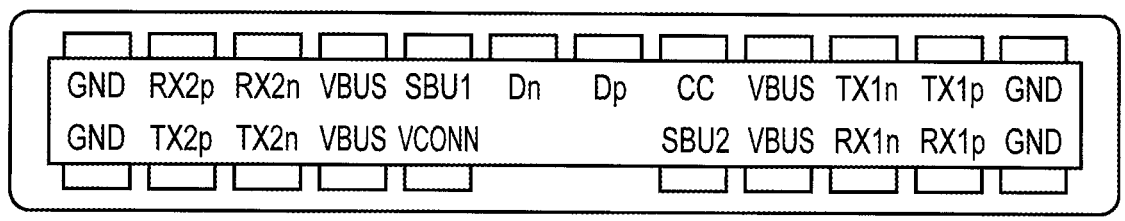
FIG. 2 shows a USB Type-C plug interface of an embodiment.

FIG. 1 shows a USB Type-C socket interface, and FIG. 2 shows a USB Type-C plug interface. As one of the characteristics of the USB Type-C cable, the connector is reversible, that is, the connector can be used either way up. The connector has a socket and a plug in a predetermined relationship so that the connector can be used either way up. In the socket interface of FIG. 1, signals are assigned in such a manner that upper twelve contacts and lower twelve contacts are symmetrical with respect to the center point. In the plug interface of FIG. 2, signals are similarly assigned in such a manner that upper contacts and lower contacts are symmetrical with respect to the center point, but some contacts are not assigned with signal lines or not arranged symmetrically.

The respective contacts of FIG. 1 will be described below. A VBus contact is a USB cable bus power source contact. A GND contact is a ground contact. Dp1, Dp2, Dn1 and Dn2 contacts are USB 2.0 serial data interface contacts. TX1$p$, TX1$n$, RX1$p$, RX1$n$, TX2$p$, TX2$n$, RX2$p$ and RX2$n$ contacts are SuperSpeed USB 3.1 serial data interface contacts. CC1 and CC2 contacts are configuration channel contacts for connection detection, signal direction detection, and channel configuration detection. SBU1 and SBU2 contacts are sideband signal contacts and may be configured to transmit data approved on both a host device side and a peripheral device side.

The respective contacts of FIG. 2 will be described below. Dp and Dn contacts are USB 2.0 serial data interface contacts. A CC contact is a configuration channel contact for connection detection, signal direction detection, and channel configuration detection. A VCONN contact is a Type-C cable plug power source contact. The other contacts are the same as those of the socket interface of FIG. 1.

When the USB Type-C cable is inserted, for example, into a USB interface on the PC side, the CC contact of the plug interface of the USB Type-C cable is connected to the CC1 or CC2 contact of the socket interface of the USB interface on the PC side.

FIG. 3 shows an embodiment. In FIG. 3, an element 300 shown on the right hand side is a USB device, and the USB device 300 comprises a Type-C connector 310. Therefore, the connector 310 comprises a connection contact 311 used as a configuration channel contact. Note that the connector 310 comprises various other connection contacts such as a power source contact, a control signal contact and the like as described above but will be omitted in the present embodiment.

On the other hand, an element 200 is an electronic device, and the electronic device 200 is, for example, a personal computer, a television device, a portable device (such as a tablet computer or a smartphone) or any other device. The electronic device 200 comprises a Type-C connector 210 which is connectable to the connector 310. The connector 210 corresponds to the connection contact 311 used as a configuration channel contact and comprises a connection contact 211 which is connected to the connection contact 311. Although only the connection contact 211 is shown in the drawing, the connector 210 comprises a plurality of connection contacts (not shown) corresponding to the plurality of connection contacts of the connector 310.

The connector 310 is connected to a controller 250 via a connection circuit 230. The controller 250 is, for example, a semiconductor integrated circuit incorporating a logical determination circuit, firmware and the like. The controller 250 is also referred to as an embedded controller. The controller 250 comprises a digital input port 251 which also functions as an event detector, and to the digital input port 251, a contact 241 of the connection circuit 230 is connected. The controller 250 further comprises a switch control port 252, and to the switch control port 252, a contact 242 of the connection circuit 230 is connected. The controller 250 further comprises an analog input port which also functions as a level detector, and to the analog input port 253, a contact 243 of the connection circuit 230 is connected.

The connection circuit 230 comprises an analog switch (hereinafter referred to simply as a switch) 237, an integration circuit 238, and a switch control circuit 232. The integration circuit 238 consists of a resistor 239 and a capacitor 240. The switch control circuit 232 comprises a hysteresis circuit 233 and an OR gate 234. An input contact 231 of the connection circuit 230 is connected to the connection contact 211 of the connector 210. The input contact 231 is also connected to the digital input port 251 via the contact 241. The input contact 231 is also connected to one contact of the switch 237 and to the hysteresis circuit 233 provided in the switch control circuit 232. An output contact of the hysteresis circuit 233 is connected to one input of the OR gate 234. The other input of the OR gate 234 is connected to the switch control port 252 via the contact 242. The output of the OR gate 234 is connected to a control contact of the switch 237. In this way, the switch 237 is closed or opened based on the output of the OR gate 234. The other contact of the switch 237 is connected to the integration circuit 238 and then connected to the analog input port 253 via the contact 243.

Further, a power source line 235 is connected to the input contact 231 of the connection circuit 230 via a resistor 236, and the analog reference potential of the input contact 231 is determined in this way.

Next, an operation performed when the USB device 300 is connected to the connector 201 of the electronic device 200 via the connector 310 will be described.

(a-1) The following description will be based on the assumption that the USB device has a resistance of 5.1 kΩ, a power source voltage is 5 V, and a resistor 236 has a resistance of 56 kΩ. Further, the hysteresis circuit 233 is assumed to output a logical high in response to an input of 2.2 V or more and output a logical low in response to an input of 0.6 V or less. When the connector 310 is connected to the connector 210, the power source voltage of 5 V is divided by the resistances of 56 kΩ and 5.1 kΩ, and the divided voltage is set as the voltage of the connection contact 211.

(a-2) Here, the voltage of the connection contact 211 is 0.5 V or less.

(a-3) Then, the output of the hysteresis circuit 233 is made low.

(a-4) Further, when a determination logic (event detection function) which determines an input to the digital input port 251 detects that the voltage is 0.5 V or less, the determination logic determines that a device is connected.

(a-5) When the input determination logic (event detection function) which determines a port input to the digital input port 251 detects that the voltage is 0.5 V or less, an input/output control logic of the analog input port 253 switches the analog input port 253 to an input state.

(a-6) Still further, the input determination logic (event detection function) which determines a port input to the digital input port 251 detects that the voltage is 0.5 V or less, the control logic of the switch control port 252 makes the switch control output low.

(a-7) As a result, in the switch control circuit 232, the two inputs of the OR gate 234 are made low (negative logic) so that the output of the OR gate 234 goes low. Finally, the switch 237 is closed. In this operation, it is possible to prevent the analog input port 253 from being connected to a peripheral device while the analog input port 253 is in an output state.

(a-8) As described above, the switch 237 is closed based on the output of the OR gate 234.

(a-9) In this way, the analog input port 253 can detect the level of a voltage input from the USB device 300 via the input contact 231. In the voltage level detection, a digital signal, a digital control signal and the like having variable voltage levels may also be detected.

Next, an operation performed when the connector 310 of the USB device 300 is removed from the connector 210 of the electronic device 200 will be described.

(b-1) In this case, the voltage of the input contact 231 becomes greater than 0.5 V.

(b-2) Based on the change in the voltage of the input contact 231, the output of the hysteresis circuit 233 is made high.

(b-3) Based on the output of the hysteresis circuit 233, the switch 237 is opened.

(b-4) Further, when the input determination logic (event detection function) which determines a port input to the digital input port 251 detects that the voltage is greater than 0.5 V, the input determination logic determines that a device has been removed.

(b-5) When the input determination logic (event detection function) which determines a port input to the digital input port 251 detects that the voltage is greater than 0.5 V, the switch control port 252 makes the switch control output high (outputs a logic level to open the switch 237).

(b-6) Still further, the input determination logic (event detection function) which determines a port input to the digital input port 251 detects that the voltage is greater than 0.5 V, the input/output control logic of the analog input port 253 switches the analog input port 253 to an output state.

(b-7) At the moment after the connector 210 of the electronic device 200 is removed from the connector 310 of the USB device 300 and before the switch 237 is opened, there is a danger that the power source voltage of 5 V is applied to the direction of the analog input port 253. However, since the integration circuit 238 is provided in the present embodiment, the power source voltage of 5 V will not be directly applied to the analog input port 253 and the switch 237 will be opened before the output of the integration circuit 239 increases, and thus safety is ensured.

There is also a case where a device is connected to the connector 210 but its interface does not belong to Type-C. This device does not comprise the contact 311. In this case, the following operation is performed.

(c-1) In this case, the level of the input contact 231 is maintained as it was before an external connector is connected, that is, the level of the input contact remains unchanged.

(c-2) Further, no event is detected by the event detection function of the digital input port 251 since there is no change in the level of the input contact 231. Therefore, the input determination logic (event detection function) which determines a port input to the digital input port 251 does not determine any connection of a device.

(c-3) Since the input determination logic (event detection function) which determines a port input to the digital input port 251 detects that the voltage is greater than 0.5 V, the input/output control logic of the analog input port 253 does not change the state of the analog input port 253 (maintains an output state).

(c-4) Still further, since the input determination logic (event detection function) which determines a port input to the digital input port 251 detects that the voltage is greater than 0.5 V, the control logic of the switch control port 252 does not change the switch control output (maintains a high level). Consequently, the switch 237 remains open.

As described above, according to the above-described embodiment, even in the case of using an existing controller 250, it is still possible to realize the present invention at low cost without newly designing a dedicated integration circuit.

Note that the above description has been based on the assumption that the connector 310 of the USB device 300 is connected to the connector 210. However, the above description is in no way restrictive. It is also possible to connect a USB cable comprising a Type-C connector to the connector 210.

Figure 4A:
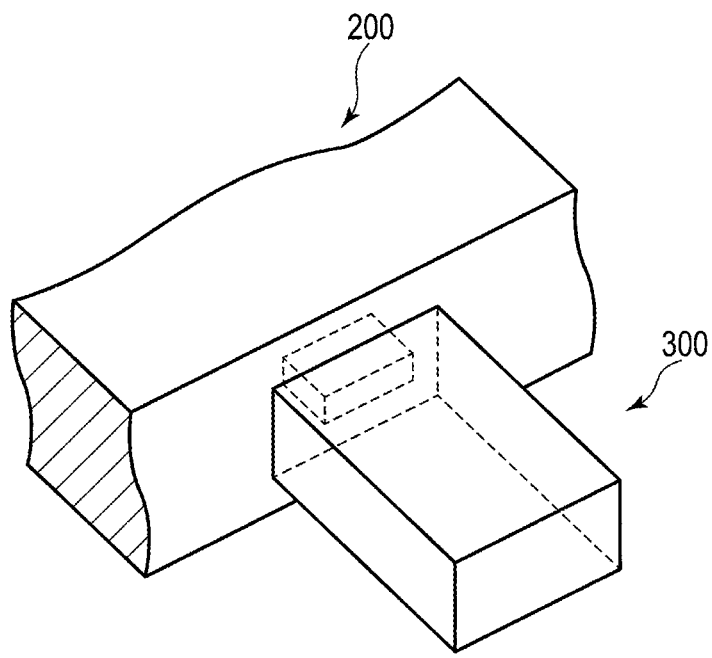
FIG. 4A shows an external appearance of a system adopting an embodiment.

FIG. 4A shows an external appearance of a system adopting an embodiment. The electronic device 200 comprises a connector provided on its side surface and connected to a connection circuit. The USB device 300 is connected to the connector externally. Here, the USB device 300 may be an electronic device comprising a memory.

Figure 4B:
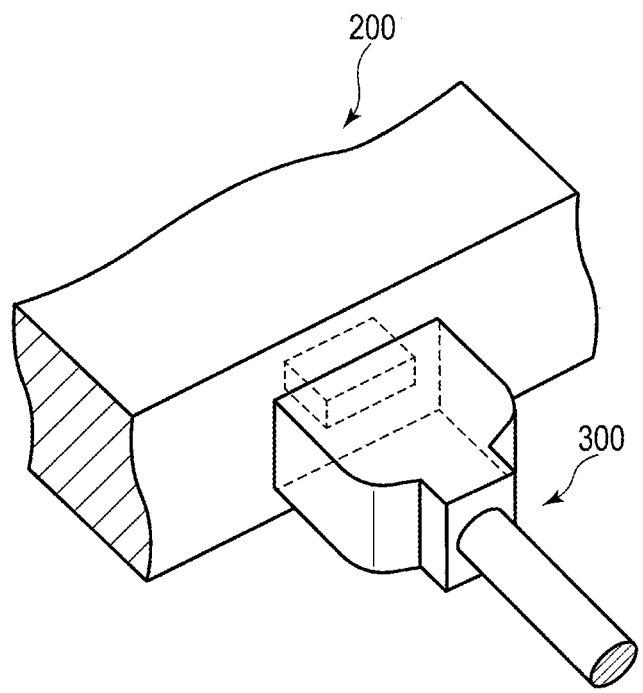
FIG. 4B shows another external appearance of a system adopting an embodiment.

FIG. 4B shows another external appearance of a system adopting an embodiment. The electronic device 200 comprises a connector provided on its side surface and connected to a connection circuit. The USB device 300 is connected to the connector externally. Here, the USB device 300 may be a USB cable. The other connector of the USB cable is connected to, for example, another electronic device. The above-described electronic device may be a personal computer, a tablet computer, an electronic camera, a television receiver, a portable device, a memory, or the like.

Figure 5:
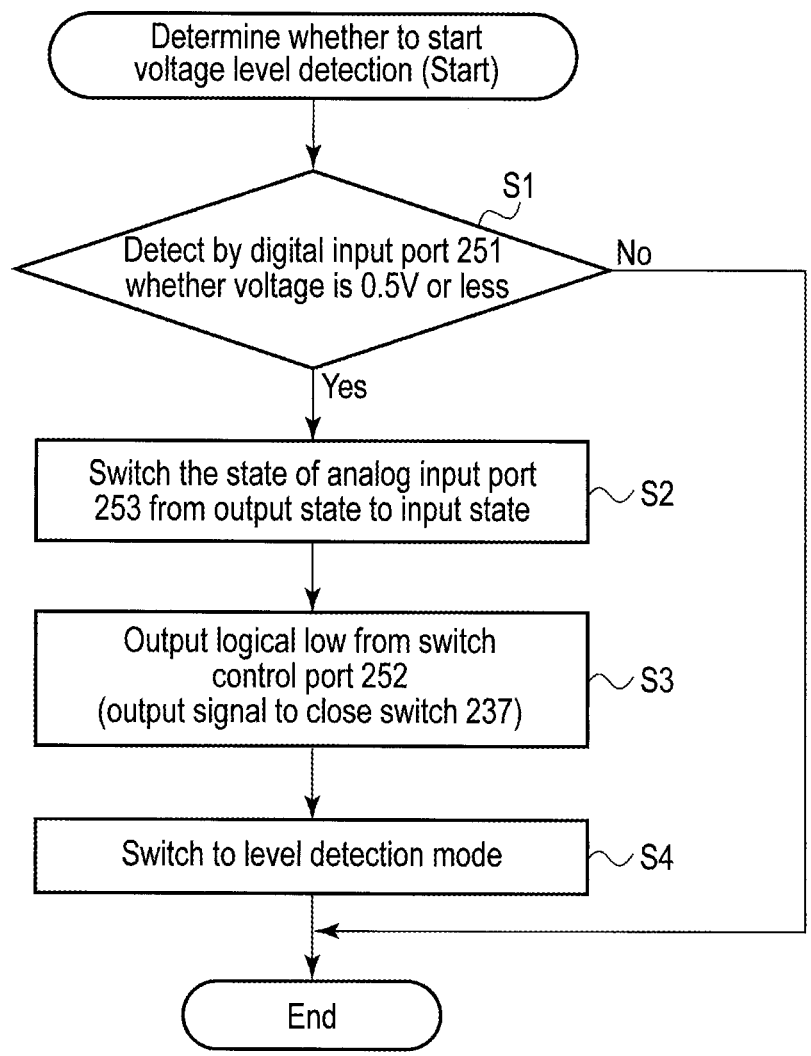
FIG. 5 is a flowchart showing exemplary processing executed by a controller when a USB device is connected to a system adopting an embodiment.

FIG. 5 is a flowchart showing exemplary processing of determining whether to start voltage level detection of the analog input port 253 when the USB device 300 is connected to the electronic device 200.

When the connector 310 is connected to the connector 210, the power source voltage of 5 V is divided by the resistances of 56 kΩ and 5.1 kΩ, and the voltage of the connection contact 211 becomes 0.5 V or less. The voltage of the contact 241 becomes 0.5 V or less, accordingly.

When the analog input port 253 does not perform voltage level detection, the digital input port 251 of the controller 250 regularly monitors a change in the voltage of the contact 241 and determines by the input determination logic whether the voltage of the contact 241 is 0.5 V or less (S1). When it is determined that the voltage is 0.5 V or less, based on the determination result, the analog input port 253 changes the internal control state to an output state (S2). Further, the switch control port 252 makes the switch control output low (S3). In this way, the controller 250 controls the operations of the analog input port 253 and the switch control port 252 based on the detection result on the voltage of the contact 241. The controller changes the internal state to a level detection mode (S4). Further, the analog input port 253 now detects an input voltage level.

On the other hand, when the digital input port 251 determines by the input determination logic that the voltage of the contact 241 is greater than 0.5 V (S11), the controller 250 ends processing without executing any operation to the analog input port 253 and the switch control port 252.

FIG. 6 is a flowchart showing exemplary processing of determining whether to end the voltage level detection of the analog input port 253 when the USB device 300 is removed from the electronic device 200.

When the connector 310 is removed from the connector 210, the voltage of the connection contact 211 becomes greater than 0.5 V. The voltage of the contact 241 becomes greater than 0.5 V, accordingly.

When the analog input port 253 performs voltage level detection, the digital input port 251 of the controller 250 regularly monitors a change in the voltage of the contact 241 and determines by the input determination logic whether the voltage of the contact 241 is greater than 0.5 V (S11). When it is determined that the voltage is greater than 0.5 V, based on the determination result, the analog input port 253 changes the internal control state to an output state (S12). Further, the switch control port 252 makes the switch control output high (S13). In this way, the controller 250 controls the operations of the analog input port 253 and the switch control port 252 based on the detection result on the voltage of the contact 241. Then, the controller changes the internal state to an idle mode (S14). Still further, the analog input port 253 stops detection of an input voltage level.

On the other hand, when the digital input port 251 determines by the input determination logic that the voltage of the contact 241 is 0.5 V or less (S11), the controller 250 ends processing without executing any operation to the analog input port 253 and the switch control port 252.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A control method of a port connection circuit including a controller, a switch and a switch control circuit, the switch connected between an input contact and a first port of the controller, the input contact connected to or disconnected from an output contact of an external connector, the switch control circuit configured to close or open the switch based on an output of the controller corresponding to a voltage of the input contact, the switch control circuit including a hysteresis circuit configured to detect that the voltage of the input contact is less than a first voltage, the control method comprising:

detecting, by the controller, a decrease in the voltage of the input contact when the voltage of the input contact is lower than the first voltage, outputting, by the switch control circuit, a control signal for closing the switch upon receiving the output of the controller which detects the decrease in the voltage of the input contact;

switching the first port to an input state by closing the switch to detect a level of a voltage input to the first port from the external connector; and closing the switch when an output of the hysteresis circuit and the output of the controller are equivalent.

2. The control method of claim 1, further comprising opening the switch on detecting by the hysteresis circuit that the voltage of the input contact is greater than the first voltage.

3. The control method of claim 1, wherein the output of the hysteresis circuit and the output of the controller are equivalent when the output of the hysteresis circuit constitutes a first signal for indicating a first logical value and the output of the controller constitutes a second signal for indicating the first logical value.

4. A control method of a port connection circuit including a controller, an input contact, a switch and a switch control circuit, the controller including a first port, a second port and a third port, the first port being configured to selectively switch to an input state or to an output state, the second port being configured to output a switch control signal, the third port being configured to detect an event, the input contact connected to or disconnected from an output contact of an external connector and connected to the third port, the switch connected between the input contact and the first port, the switch control circuit including a hysteresis circuit and an OR gate, the hysteresis circuit to which a voltage of the input contact is input, the OR gate logically adding an output of the hysteresis circuit and the switch control signal from the second port and outputting a result to a control contact of the switch, the switch control circuit closing or opening the switch in response to the output of the OR gate, wherein:

the output of the hysteresis circuit becomes a first logical value when the voltage of the input contact is lower than a first voltage due to connecting the external connector;

the output of the OR gate becomes the first logical value upon the controller determining an input voltage of the third port and switching an output of the second port from a second logical value to the first logical value; and the control method comprises changing the switch from an open state to a close state via the output of the OR gate to detect a level of a voltage input to the first port from the external connector.

5. The control method of claim 4, wherein:

the output of the hysteresis circuit becomes the second logical value when the voltage of the input contact is greater than a first voltage due to removing the external connector;

the output of the OR gate becomes the second logical value upon the controller determines the input voltage of the third port and switches the output of the second port from the first logical value to the second logical value; and the control method further comprises changing the switch from the close state to the open state via the output of the OR gate to stop the detection of the level of the voltage input to the first port and to switch the first port from the input state to the output state.

6. A port connection circuit comprising:

a connector including an input contact adapted for connection to or disconnection from an output contact of an external connector;

a controller including a first port;

a switch connected between the input contact and the first port of the controller; and a switch control circuit configured to close or open the switch based on an output of the controller corresponding to a voltage of the input contact, the switch control circuit comprises a hysteresis circuit configured to detect a voltage of the input contact is less than a first voltage, wherein the controller is configured to detect a decrease in the voltage of the input contact when the voltage of the input contact is lower than the first voltage, and the switch control circuit is configured to (i) output a control signal for closing the switch in response to an output of the hysteresis circuit and an output of the controller, upon the controller detecting the decrease in the voltage of the input contact, are equivalent and (ii)

place the first port of the controller into an input state to detect a level of a voltage input to the first port from the external connector when the switch is closed.

7. The port connection circuit of claim 6, wherein the switch control circuit to output the control signal for closing the switch in response to the output contact of the external connector being connected to the input contact of the connector.

8. The port connection circuit of claim 6, wherein the switch control circuit is configured to open the switch upon detecting by the hysteresis circuit that the voltage of the input contact is greater than the first voltage.

9. The port connection circuit of claim 8, wherein the voltage of the input contact is greater than the first voltage in response to the output contact of the external connector being disconnected to the input contact of the connector.

10. The port connection circuit of claim 6, wherein the switch control circuit further comprises a logical gate including a first input coupled to a second port of the controller and a second input coupled to the hysteresis circuit.

11. The port connection circuit of claim 10, wherein the second port of the controller to output a first signal for indicating a first logical value to the first input of the logical gate and the hysteresis circuit to output a second signal for indicating the first logical value to the second input of the logical gate in response to the controller detecting the voltage of the input contact is lower than the first voltage.

12. The port connection circuit of claim 10, wherein the logical gate operates as an OR gate.

* * * * *